United States Patent
Boffelli

(10) Patent No.: US 11,801,985 B2
(45) Date of Patent: Oct. 31, 2023

(54) PACKAGE FOR DAIRY PRODUCTS, SHEET, MULTI-LAYER FILM AND METHOD ASSOCIATED

(71) Applicant: Egidio Galbani S.r.l., Milan (IT)

(72) Inventor: Giuliano Boffelli, Milan (IT)

(73) Assignee: Egidio Galbani S.r.l., Milan (IT)

( * ) Notice: Subject to any disclaimer, the term of this patent is extended or adjusted under 35 U.S.C. 154(b) by 678 days.

(21) Appl. No.: 16/613,310

(22) PCT Filed: May 15, 2018

(86) PCT No.: PCT/IT2018/050084
§ 371 (c)(1),
(2) Date: Nov. 13, 2019

(87) PCT Pub. No.: WO2018/211542
PCT Pub. Date: Nov. 22, 2018

(65) Prior Publication Data
US 2020/0148443 A1    May 14, 2020

(30) Foreign Application Priority Data
May 15, 2017   (IT) .................. 102017000052473

(51) Int. Cl.
  *B65D 75/00*       (2006.01)
  *B65B 5/02*        (2006.01)
  (Continued)

(52) U.S. Cl.
  CPC ........ *B65D 75/008* (2013.01); *A23C 19/0684* (2013.01); *B65B 5/022* (2013.01);
  (Continued)

(58) Field of Classification Search
  CPC ...... B65D 75/008; B65D 75/20; B65D 81/22; B65D 85/76; B65D 65/40; B65B 5/068; B65B 5/045; B65B 5/022; B65B 25/068
  (Continued)

(56) References Cited

U.S. PATENT DOCUMENTS 4,997,416 A    3/1991  Mitchell et al.
5,352,043 A *  10/1994 Takagaki .............. B31B 70/008
                                                493/194
(Continued)

FOREIGN PATENT DOCUMENTS

AU    1926383 A       3/1984
CA    2639582 A1 *    4/2009  ........... B65D 75/008
(Continued)

OTHER PUBLICATIONS

Int'l Search Report and Written Opinion dated Aug. 28, 2018 in Int'l Application PCT/IB2018/050084.

*Primary Examiner* — Rafael A Ortiz
(74) *Attorney, Agent, or Firm* — Panitch Schwarze Belisario & Nadel LLP; Martin G. Belisario

(57) ABSTRACT

A package for dairy products, in particular solid or semi-solid dairy products, including a bag provided with at least one pair of lateral walls reciprocally joined by means of first welding lines and at least one bottom wall, so as to define a housing compartment. A dairy product is housed in the compartment defined inside the bag. The bag includes second welding lines made in correspondence with top parts of the bag and positioned on opposite sides of the bottom wall. The second welding lines are disposed diagonally with respect to the first welding lines and with respect to the bottom wall and configured and oriented so as to progressively narrow the housing compartment toward the bottom wall of the bag. The dairy product includes at least a central (Continued)

support zone on the bottom wall and the bag includes at least lateral support zones defined by the opposite top parts.

6 Claims, 5 Drawing Sheets

(51) Int. Cl.
| | |
|---|---|
| *B65B 5/04* | (2006.01) |
| *B65B 25/06* | (2006.01) |
| *B65D 65/40* | (2006.01) |
| *B65D 75/20* | (2006.01) |
| *B65D 81/22* | (2006.01) |
| *B65D 85/76* | (2006.01) |
| *A23C 19/068* | (2006.01) |

(52) U.S. Cl.
CPC ............ *B65B 5/045* (2013.01); *B65B 25/068* (2013.01); *B65D 65/40* (2013.01); *B65D 75/20* (2013.01); *B65D 81/22* (2013.01); *B65D 85/76* (2013.01); *B65B 2220/24* (2013.01)

(58) Field of Classification Search
USPC .................................. 206/551; 426/130, 106
See application file for complete search history.

(56) References Cited

U.S. PATENT DOCUMENTS

| | | | | |
|---|---|---|---|---|
| 6,254,907 | B1 * | 7/2001 | Galomb | B65D 75/008 |
| | | | | 206/541 |
| 9,560,835 | B1 * | 2/2017 | Bastone, Jr. | B65B 3/04 |
| 2004/0234174 | A1 * | 11/2004 | Caudle | B29C 66/431 |
| | | | | 383/104 |
| 2008/0142085 | A1 * | 6/2008 | Burkard | B65D 75/5805 |
| | | | | 206/774 |
| 2015/0197388 | A1 | 7/2015 | Maglio, Jr. | |

FOREIGN PATENT DOCUMENTS

| | | | | |
|---|---|---|---|---|
| GB | 2298850 A | * | 9/1996 | ............ B65B 41/16 |
| GB | 2298850 A | | 9/1996 | |
| IT | 102017000045291 | | 7/2019 | |
| JP | 3731948 B2 | | 1/2006 | |
| WO | 91/17089 A1 | | 11/1991 | |
| WO | WO-9941155 A1 | * | 8/1999 | ............... B31B 1/84 |
| WO | 01/85560 A1 | | 11/2001 | |
| WO | WO-0185560 A1 | * | 11/2001 | ........... B65D 75/008 |
| WO | WO-0226567 A2 | * | 4/2002 | ........... B65D 75/008 |
| WO | WO-02074653 A1 | * | 9/2002 | ........... B65D 75/008 |
| WO | 03/18418 A1 | | 3/2003 | |

* cited by examiner

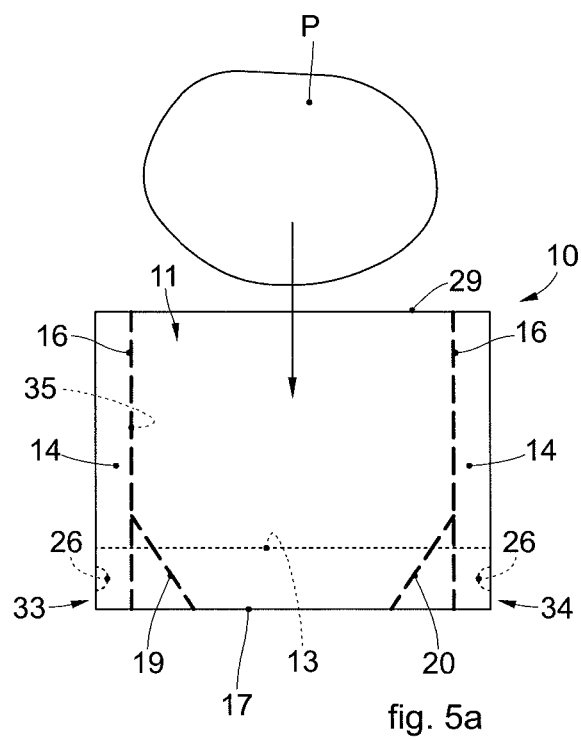
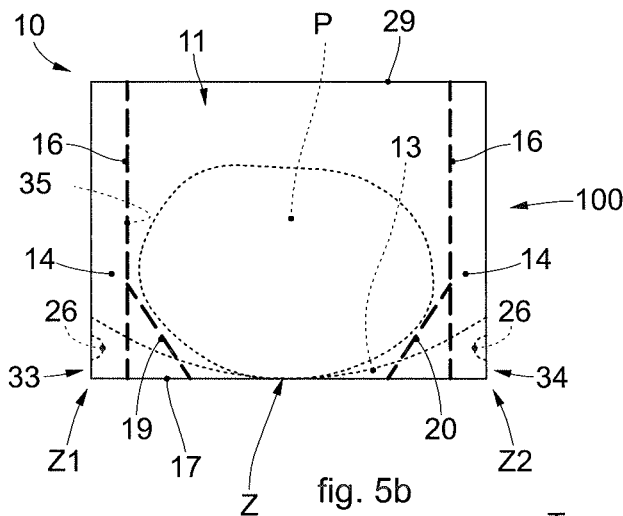
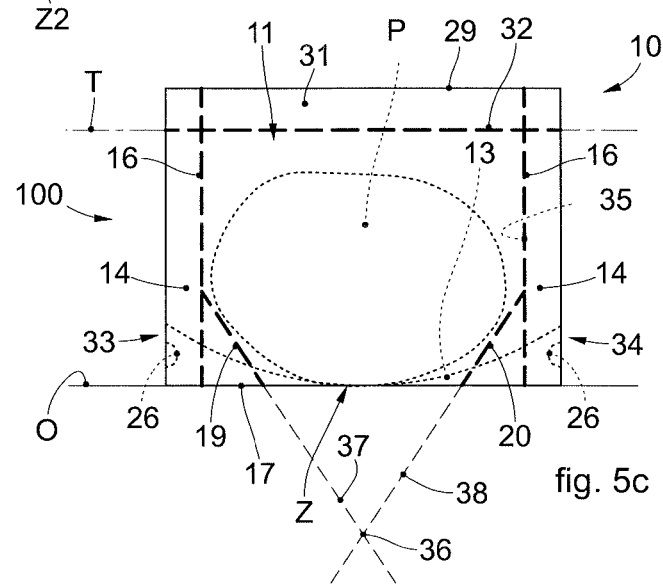

PACKAGE FOR DAIRY PRODUCTS, SHEET, MULTI-LAYER FILM AND METHOD ASSOCIATED

CROSS-REFERENCE TO RELATED APPLICATIONS

This application is a Section 371 of International Application No. PCT/IT2018/050084, filed May 15, 2018, which was published in the English language on Nov. 22, 2018, under International Publication No. WO 2018/211542 A1, which claims priority under 35 U.S.C. § 119(b) to Italian Application No. 102017000052473, filed May 15, 2017, the disclosures of each of which are incorporated herein by reference.

FIELD OF THE INVENTION

The present invention concerns a package for dairy products, in particular solid or semi-solid dairy products which, inside the package, are immersed in a preserving liquid, for example "pasta filata" or stretched curd cheeses, such as mozzarella or suchlike. The present invention also concerns a method to make a package for dairy products.

BACKGROUND OF THE INVENTION

It is known that normal packages for dairy products with preserving liquid consist of a multi-layer film comprising two or more layers of film, generally plastic, joined by suitable adhesion processes. One of the two layers is usually made of polyethylene and is weldable, an essential characteristic for the production of the finished package, made by welding the edges thereof. The welding can take place for example by heat-sealing or other current technique.

Normal packages for dairy products, for example mozzarella, generally consist of bags which normally tend to take on a rather squashed shape and, upon opening, the mozzarella contained inside the package may be undesirably deformed or crushed.

Furthermore, the disposition of such known packages inside display cases, refrigeration counters or suchlike generally occurs in a disorderly and confused manner, also causing disadvantages to the consistency and quality of the final product.

Moreover, also during the packaging step, the dairy product runs the risk, with current packages, of being undesirably flattened or otherwise deteriorated, due to the forces in play during the packaging steps. This disadvantage of the deformation of the dairy product during packaging is further accentuated if the product is packaged hot and before the cooling and firming step, as described in the Italian patent application n. 102017000045291 in the name of the Applicant.

The fact that the package therefore tends to be compressed and squashed is therefore a disadvantage both in the packaging step and also in the storage and distribution steps, and even in domestic storage, in refrigerators or other, since it is difficult to dispose known packages in a stable and orderly manner inside a refrigerator, or other.

There are also rigid packages for liquids or dairy products that are able to maintain a substantially vertical position, for example bags for grated cheese, but these bags are made with thick film, so a film that proves to be very rigid, not very flexible or very soft and, in general, unsuitable for packaging and use with dairy products provided with preserving liquid.

Examples of packages that are mostly rigid and suitable for packaging, in particular liquids, are described for example in documents WO-A-91/17089, US-A-2004/234174, U.S. Pat. No. 4,997,416, JP-B-3731948, WO-A-03/18418 and AU-A-1926383.

The packages described in these documents are affected by the disadvantages of the other packages cited above, and also they are particularly unsuitable if used for a dairy product that is introduced into the package by falling, in particular a dairy product that is still hot and deformable.

In such rigid packages, in fact, the conformation of the lateral walls and the bottom would not adequately adapt to the dairy product introduced, and would indeed cause the product to be crushed, especially on the sides, which would cause undesired deformation.

In other words, for solid or semi-solid dairy products which during packaging are still hot or in any case for dairy products which have a certain deformability, these packages are unsuitable to maintain the desired shape and consistency of the product, also determining, in some cases, the possible damage or deterioration thereof.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to perfect a package for dairy products, in particular solid or semi-solid dairy products, which, inside the package, in particular, are immersed in a preserving liquid, which can overcome at least one of the disadvantages of the state of the art.

One purpose of the present invention is therefore to provide a package for dairy products, in particular dairy products which, inside the packages, are immersed in a preserving liquid, which has a stability and resistance such as to prevent unwanted compressions or crushing of at least a dairy product contained inside it and in particular has a resistance and stability such that it can be disposed on a support plane even with only the bottom of the package, so that it can be stored, displayed, preserved and used once opened, in a substantially vertical position, without spilling the liquid, which is impossible with current and common bags or packages.

Another purpose of the invention is to provide a package for dairy products which is substantially able to assume a substantially vertical and stable position, although a more flexible, softer material is preferably used, and about 30 to 50% thinner than the films commonly used for packages that stay in a vertical position, that is, a package for dairy products that, once at least one dairy product and its preserving liquid have been inserted inside it, is substantially self-stabilizing.

Another purpose of the invention is to provide a package for dairy products that is able to discharge the weight force of at least one dairy product introduced, in particular at least one dairy product with preserving liquid, also on the sides of the package and not only on the bottom, as normally happens in current packages, thus increasing the stability and resistance of the package and thus providing a support on both sides of the package for the product contained therein, so that the product is positioned substantially in a central position inside the package.

Another purpose of the invention is to provide a package for dairy products that allows to maintain the desired shape of the dairy product packaged, in particular when the product is introduced by falling into the package, even when it is still hot and deformable, as is typical for some dairy products, in which the walls of the package itself do not approach too much toward the center and do not therefore crush the product laterally from both sides, deforming it in an unwanted manner, and thus preventing a sort of "vice" effect on the product by the lateral walls of the package.

Another purpose of the present invention is to perfect an efficient and reliable method for manufacturing packages for dairy products.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purpose, a package for dairy products according to the invention, in particular solid or semi-solid dairy products, comprises: a bag provided with at least one pair of lateral walls reciprocally joined by means of first welding lines and at least one bottom wall, so as to define one housing compartment; at least one dairy product housed in the compartment defined inside the bag.

According to a characteristic aspect of the invention, the bag comprises second welding lines made in correspondence with top parts of the bag and positioned on opposite sides of the bottom wall; the second welding lines are disposed diagonally with respect to the first welding lines and with respect to the bottom wall and configured and oriented so as to progressively narrow the housing compartment toward the bottom wall of the bag; the dairy product comprises at least a central support zone on the bottom wall and the bag comprises lateral support zones defined by at least the opposite top parts.

The dairy product can be at least partly immersed in a preserving liquid.

The dairy product can be at least a ball of stretched curd cheese, such as mozzarella or suchlike.

The central support zone of the dairy product is defined by a rounded surface, such as a circular, oval, elliptical or similar surface.

According to another aspect of the invention, the second inclined welding lines are made in welding directions that intersect the bottom wall of the package.

The second welding lines can provide ideal extension lines that intersect at a point positioned externally to the bottom wall of the package.

The package preferably comprises a pair of inclined second welding lines that are specular with respect to a longitudinal center line axis of the package.

The angle of inclination of the inclined second welding lines can be comprised between 15° and 60°, advantageously about 45°.

The bottom wall of the package can be made in a single piece with the lateral walls.

The bottom wall can also be recessed toward the inside of the package, so that at least one folding line is created therein.

The invention also concerns a sheet to make a bag for a package for dairy products, comprising welding directions able to intersect formation lines of the bottom wall.

The multi-layer film can comprise a series of sheets, for example graphical sheets, located in sequence and able to form a series of bags.

The multi-layer film can comprise at least an external layer, configured to act, among other characteristics, as a support for possible printed areas both on the internal side and on the external side of the layer in question and an internal welding layer.

One or more intermediate layers of film can always be provided depending on the productive characteristics and of the functions required in the packaging material.

The present invention also concerns a method to make a package for dairy products, in particular dairy products with a preserving liquid. According to a characteristic aspect of the invention the method comprises: shaping a sheet so as to obtain at least two lateral walls and at least one bottom wall; a first step of welding the lateral walls by means of first welding lines so as to obtain a bag provided with at least one housing compartment for at least one dairy product; at least a second step of welding the lateral walls by means of second welding lines made in correspondence with top parts of the bag and positioned on opposite sides of the bottom wall; the second welding lines are inclined with respect to the first welding lines and with respect to the bottom wall, so as to create a progressive narrowing of the housing compartment toward the bottom of the bag and so as to create lateral support zones defined by at least the opposite top parts; introducing the at least one dairy product inside the compartment so that the dairy product provides at least one central support zone on the bottom wall; closing the package by means of joining the lateral walls in proximity to corresponding upper edges.

The dairy product can be inserted inside the bag while still warm, that is, before a cooling step of the package. The dairy product can be inserted in the bag downstream, for example, of a stretching process, if the dairy product is a stretched curd cheese.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIGS. 5a-5c schematically show the steps of introducing a dairy product, for example a mozzarella, inside the package obtained;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
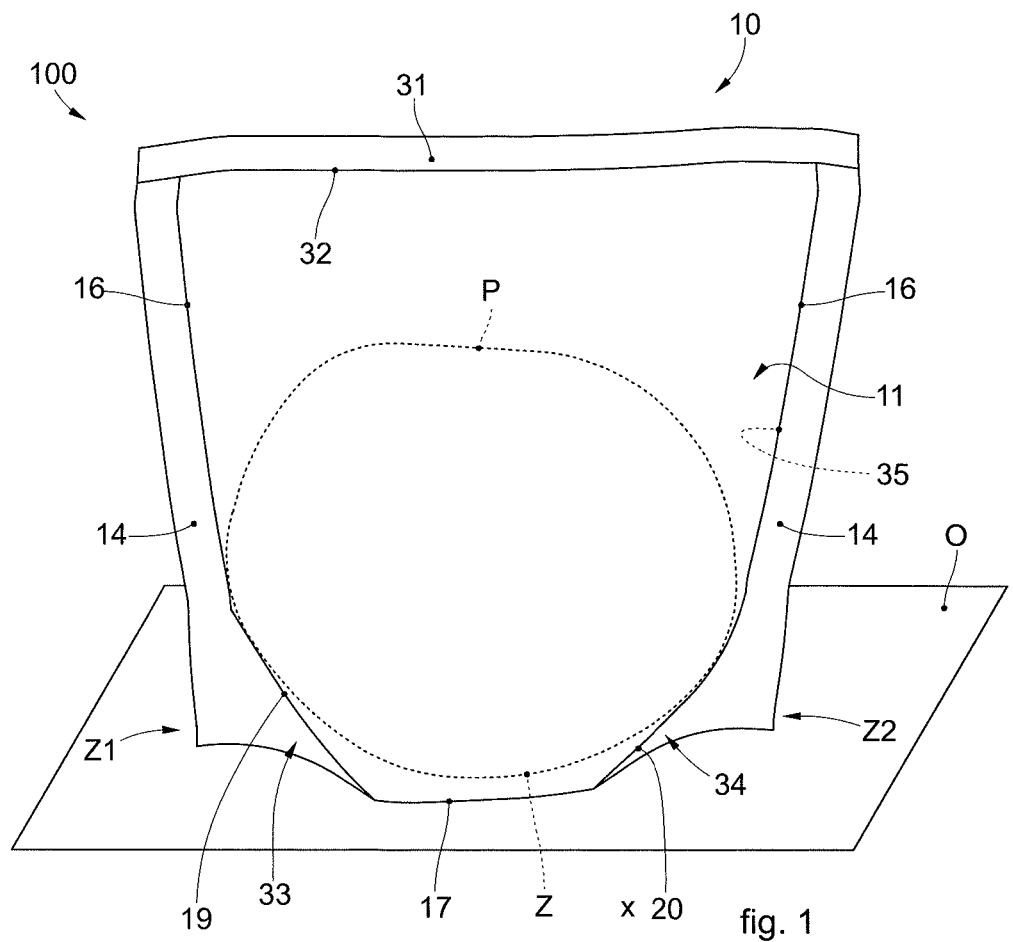
FIG. 1 is a schematic three-dimensional view of the package for dairy products according to the invention and comprising inclined or substantially diagonal welding lines.
Figure 2:
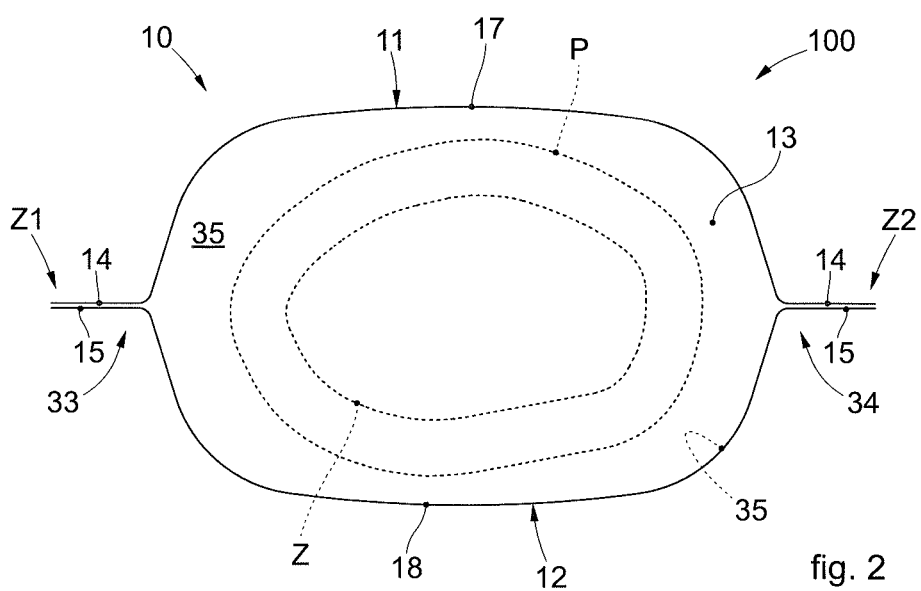
FIG. 2 is a schematic view of the bottom of the package of FIG. 1.

With reference to the attached drawings and with particular reference to FIGS. 1 and 2, a package 100 for dairy products according to the invention comprises a bag 10 provided with two lateral walls 11 and 12, of which a first wall 11 will identify, for example, a front wall of the bag 10 and a second wall 12 will identify, for example, a back wall of the bag 10.

The package 100 also comprises, in addition to the bag 10, a dairy product P, for example a solid or semi-solid dairy product.

The dairy product P can be contained in its own preserving liquid and can be, for example, a stretched curd cheese, for example at least one ball of mozzarella, as shown, or suchlike.

The lateral walls 11 and 12 are positioned substantially in a vertical position, or slightly inclined, and are associated with a bottom wall 13.

The two walls 11 and 12 are joined together, for example by welding lines 16, directed substantially in a longitudinal direction, in proximity to the respective lateral edges 14 and 15.

The lateral walls 11 and 12 also comprise lower edges 17 and 18 protruding with respect to the back wall 13.

The edges 17 and 18 can be formed by flaps folded back on themselves and welded, so as to guarantee a suitable support for the bag 10 and to keep it in a substantially vertical position.

The lateral walls 11 and 12 comprise a pair of upper closing edges 31, joined together, for example, by a welding line 32.

The bag 10 advantageously comprises a pair of welding lines 19 and 20 on each side of the package 10 and in proximity to the bottom wall 13, in particular in correspondence with two opposite top parts 33 and 34 of the bag 10.

The welding lines 19 and 20 are disposed inclined, or diagonally, with respect to the welding lines 16 and with respect to the bottom wall 13.

Within the field of the present invention, the term "diagonal" means a segment, rectilinear or curved, which joins two points, respectively of a first welding line 16 and of the bottom wall 13, being inclined with respect to a longitudinal center line axis L of the package, toward the back wall 13. Consequently, when the term "diagonal" is used with reference to the second welding lines 19, 20 and 19', 20', it means that they are disposed in such a way as to join, according to a straight path (visible in FIGS. 4e and 5a-5c) or curvilinear (visible in FIGS. 6 and 7), at least one point of the first welding lines 16 with at least one point of the bottom wall 13 according to a disposition whereby this last point is at a smaller distance from the longitudinal axis L than the point of the first welding lines 16, so as to define a "convergent" configuration toward the bottom wall 13.

Figure 3:
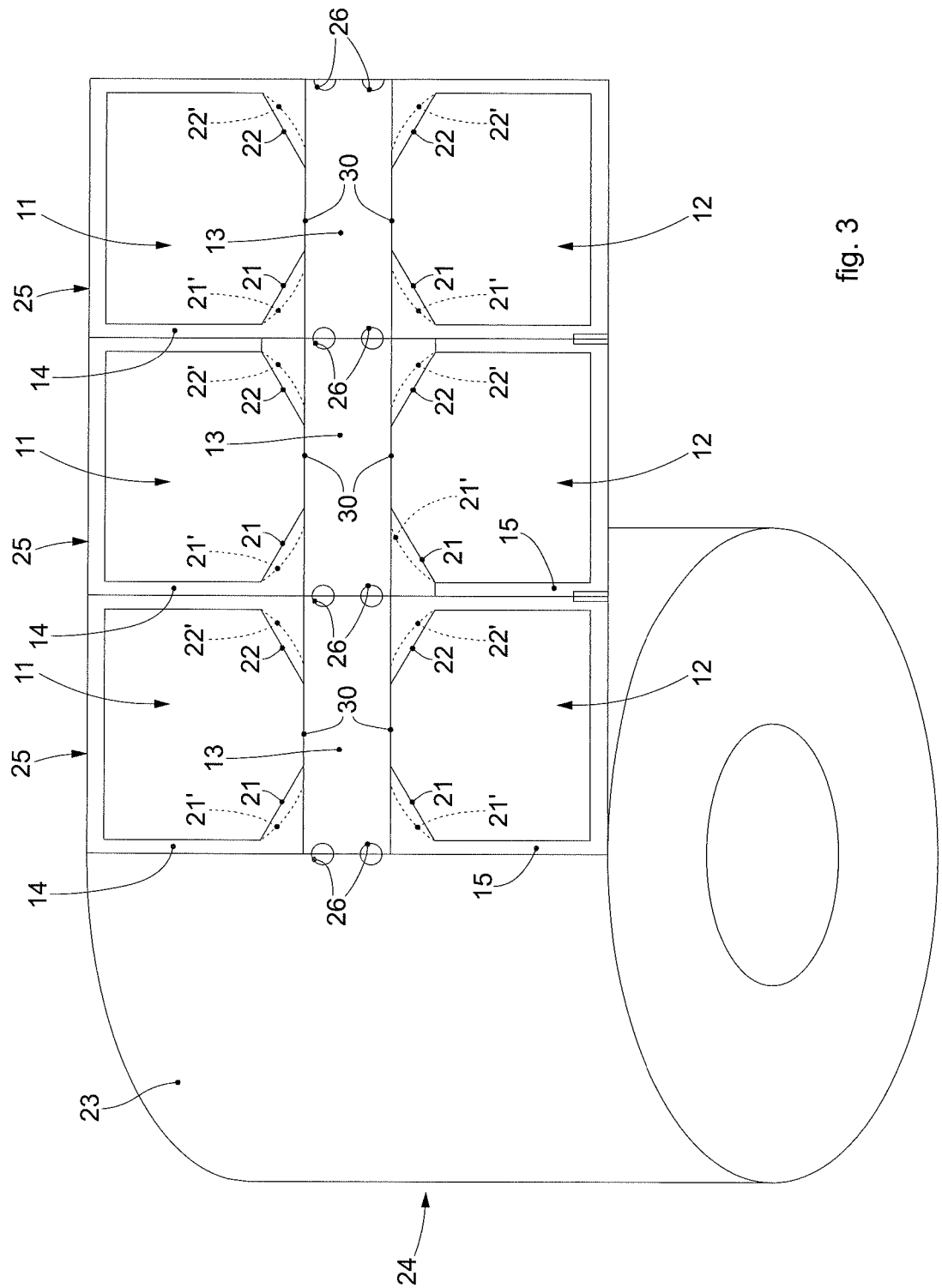
FIG. 3 is a schematic three-dimensional view of a reel of multi-layer film to make several packages for dairy products according to the invention.

The welding lines 19 and 20 are substantially made in welding directions 21 and 22, see also FIG. 3, which intersect the formation lines 30 of the bottom wall 13 of the package, therefore intersect the bottom wall 13 itself.

The inclined welding lines 19 and 20 advantageously have the purpose of providing an adequate support for the dairy product P contained inside the bag 10. The inclined welding lines 19 and 20 advantageously allow substantially to discharge at least part of the weight of the dairy product P, and of its preserving liquid, on the sides of the bag 10 and not, therefore, only on the bottom wall 13, allowing to obtain, fundamentally, a self-stabilizing package 100. As can also be seen from FIG. 4e, the welding lines 19 and 20, disposed inclined or diagonally, ideally converge toward the outside of the bag 10 and the corresponding extension lines 37 and 38 ideally intersect at a point 36 outside the bag 10.

The fact that the welding lines 19 and 20 ideally intersect outside the bag 10 and at point 36 allows to increase the stability of the package 100 and substantially to lower the center of gravity of the package 100, once filled with the dairy product P, or with dairy products.

Moreover, in this way, advantageously, the dairy product P is in no way crushed or deformed by the lateral walls 11 and 12 of the bag 10. This last aspect is important if one considers that the dairy product P could be deformable, for example if it is inserted still hot and by falling inside the bag 10.

Preferably, the point 36 of intersection of the extension lines 37 and 38 is positioned on the longitudinal axis L of symmetry of the bag 10.

The dairy product P is configured to rest on any support plane O whatsoever, by means of a support zone Z on the bottom wall 13 of the package 10, which, by means of the protruding lower edges 17 and 18 of the lateral walls 11 and 12 of the package 10, in particular the lower edges 17 and 18 situated in correspondence with the opposite top parts 33 and 34, which define lateral support zones Z1, Z2.

The package 100 comprises the bag 10 and at least one dairy product P, and is therefore provided with great stability of support, thanks to the support zone Z defined by the dairy product P and thanks to the opposite top parts 33 and 34 of the package 10 which define the lateral support zones Z1, Z2.

In particular, the central support area Z is defined by a rounded surface, for example with a circular, oval, elliptical or similar shape, so as to guarantee a stable support of the packaging system 100.

Although the bag 10 is preferably formed by a multi-layer film 23 made of soft and flexible material, the package 100 with the dairy product P introduced into the bag 10 has self-stabilizing characteristics, which allow it to advantageously remain in a vertical position.

The multi-layer film 23 is advantageously about 30 to 50% thinner than the films commonly used for rigid packages which maintain a substantially vertical position.

The inclined welding lines 19 and 20 also allow to keep the shape of the dairy product P unchanged, without subjecting it to crushing or deformation.

Such deformations or crushing, in particular, could occur, as we said, if the dairy product P is introduced into the bag 10 still warm, that is, in a process of working stretched curd cheeses in which the packaging step is before the cooling step, in accordance with the patent application n. 102017000045291 in the name of the Applicant.

The package 100, provided with a bag 10 with the inclined welding lines 19 and 20, is therefore particularly advantageous for this type of processing of dairy products, such as stretched curd cheeses or suchlike.

The package 100, being substantially self-stabilizing, is advantageously able to remain in a substantially vertical position, for example for display, preservation or other.

Figure 4A:
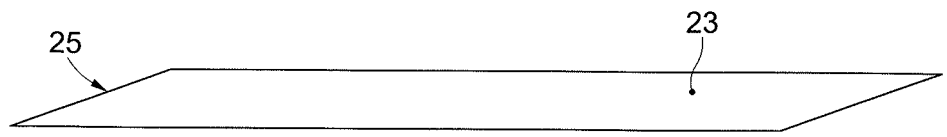
FIGS. 4a-4e schematically show the production steps of the present package for dairy products.
Figure 4B:
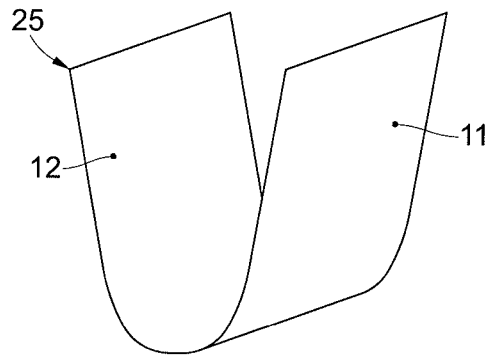
Figure 4C:
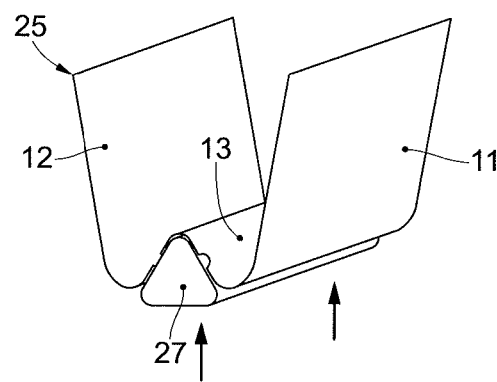
Figure 4D:
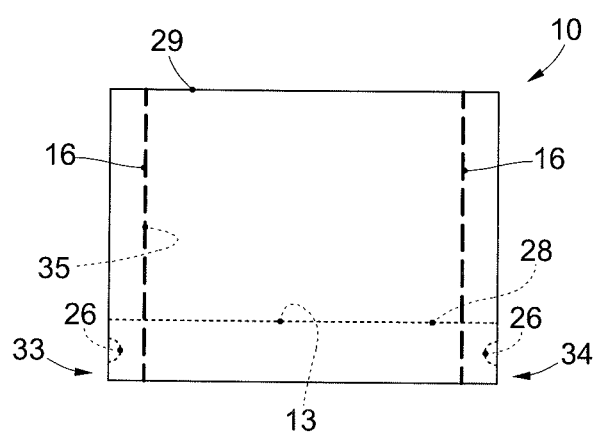
Figure 4E:
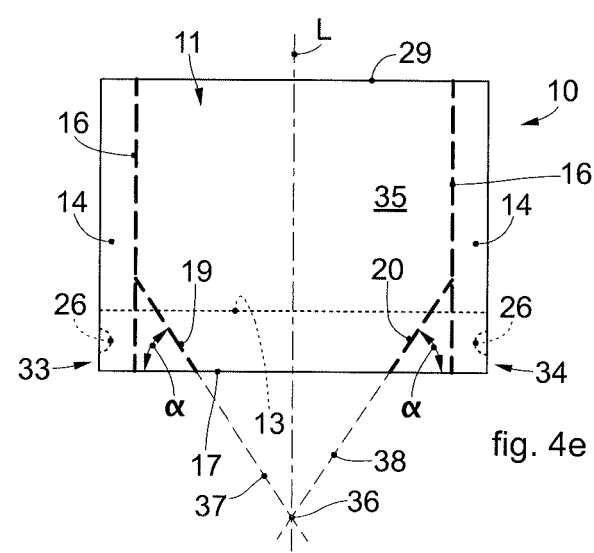

Preferably, the inclined welding lines 19 and 20 are specular with respect to the longitudinal center line axis L of the bag 10, see FIG. 4e.

The angle of inclination α of the inclined welding line 19 and/or 20 can be comprised between 15° and 60° and is preferably equal to about 45°.

The bag 10 can be made from a reel 24 of multi-layer film 23.

The multi-layer film 23 can comprise an outer layer of nylon, which can be a support to possible printed or similar areas, an intermediate welding layer, for example made of cast polyethylene or suchlike, and an internal welding layer, for example of extruded heat-sealable polyethylene.

The overall thickness of the multi-layer film 23 can be comprised for example between about 70 μm and about 80 μm.

This composition of the multi-layer film 23 allows to obtain a package 100 endowed with resistance and at the same time with softness, above all on the corners, so as to avoid problems of deterioration and even perforation of the lateral walls 11 and 12 and/or the bottom wall 13 of a first package 100 caused by the corners of a second package 100 which comes into contact with the first package, in the case where, for example, several packets 100 are located near each other.

This reciprocal drawing together and contact of the packages 100 can occur, for example, during the cooling step of the packages 100 in suitable cooling tanks, containing for example cooling water and into which the packages are poured.

FIG. 3 shows schematically the reel 24 with the multi-layer film 23, which comprises a series of sheets 25 from which as many bags 10 can be made.

The sheets 25 comprise, in addition to the elements previously described, holes 26 in proximity to the lateral edges 14 and 15 and the bottom wall 13 of the package that will be formed.

The holes 26 have the purpose of allowing the welding head to operate correctly, for example in making the welds located in proximity to the bottom wall 13 of the bag 10.

FIGS. 4a to 4e schematically show some steps of forming the bag 10 starting from one of the sheets 25 of the multi-layer film 23. The sheets 25 can be, for example, graphical sheets or suchlike.

Assuming that the sheet 25 is in a lying position, FIG. 4a, a first step of the process, carried out by suitable means, consists in folding the sheet 25 on both sides so as to obtain a substantially U-shape, as shown in FIG. 4b.

In this U-shaped configuration the lateral walls 11 and 12 of the package to be formed can already be identified.

The bottom wall 13 is shaped by deforming toward the inside the bottom part of the U-shaped sheet 25, as shown schematically in FIG. 4c.

This shaping of the bottom wall 13 can take place by means of any suitably shaped thruster member 27, so that, in fact, the bottom wall 13 is at least partly recessed.

Subsequently, the two longitudinal welding lines 16 are made in proximity to the edges 14 and 15 of the lateral walls 11 and 12, so as to form an internal compartment 35 to house the dairy product P.

The bottom wall 13 of the package could comprise a folding line 28 on which a light weld is carried out, to confer the appropriate recessed shape.

In FIG. 4d, therefore, the bag 10 is closed at the lower part by a bottom wall 13 and laterally by the welding lines 16, while it comprises an aperture 29, located at the upper part and able to allow the insertion of the dairy product P.

In the step of FIG. 4e, the two inclined welding lines 19 and 20 are formed on the bag 10 in the welding directions 21 and 22 indicated on the sheet 25 in FIG. 3.

Therefore, substantially, the inclined welding line 19 will be formed on the overlap of the welding directions 21 of the lateral wall 11 and of the lateral wall 12 and the welding line 20 will be formed on the overlap of the welding directions 22 of the lateral wall 11 and of the lateral wall 12.

The welding lines 19 and 20 disposed diagonally, therefore, substantially restrict the compartment 35 for housing the dairy product P progressively toward the bottom wall 13 of the bag 10.

As we said, the inclined welding lines 19 and 20 intersect the formation lines 30 of the bottom wall 13 and therefore the bottom wall 13 itself.

The welding lines 19 and 20 can be formed on the bag 10 substantially simultaneously with the longitudinal welding lines 16, or in a subsequent step.

The welding lines 19, 20 are made in correspondence with the top parts 33, 34 of the package 100 positioned on opposite sides of the bottom wall 13, so as to substantially define lateral support zones Z1 and Z2.

FIG. 5a schematically shows the introduction of a dairy product P, for example a mozzarella, inside the compartment 35 made in the bag 10.

As we said before, the dairy product P could be introduced into the bag 10 still hot, and therefore at risk of being deformed. Therefore it could be inserted inside the bag 10 before a cooling process of the package 100.

The dairy product P can be inserted in the bag 10, for example downstream of a stretching process, if the dairy product P is a stretched curd cheese.

The cooling process of the package 100 could advantageously take place in one or more tanks containing cooling water. In this way, the package 100 comprising the bag 10 with inside the dairy product P is cooled effectively and without causing pollution or excessive turbidity of the cooling water, which therefore can possibly be re-used for other cooling processes.

In fact, since the dairy product P is contained in the bag 10 with a suitably maintained shape thanks to the structure of the present package 100, it does not come into direct contact with the water during cooling.

It can be provided to introduce a suitable preserving liquid inside the package 10.

As can be seen from FIG. 5b, the dairy product P rests partly on the bottom wall 13 of the bag 10 and, above all, at least part of the forces generated by its weight and that of its preserving liquid is discharged onto the inclined welding lines 19 and 20, thus allowing a self-stabilization of the package 100 substantially in a vertical position with respect to the support plane O. The dairy product P therefore provides the support zone Z situated centrally on the bottom 13 of the bag 10 of the package 100.

The bottom wall 13 and the welding lines 19 and 20 thus form a sort of surrounding and stable support for the dairy product P and for the corresponding preserving liquid, also preventing undesired deformations of the dairy product P.

The package 100 can finally be closed by, for example, the welding line 32, directed in a substantially transverse direction T, see FIG. 5c.

Figure 6:
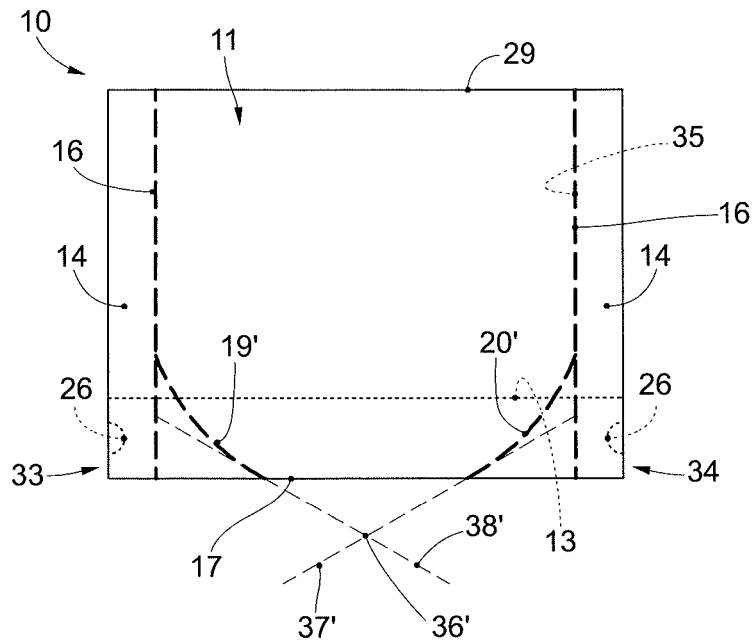
FIGS. 6 and 7 are schematic views of a package according to the invention comprising variants of the inclined or substantially diagonal welding lines.

FIG. 6 shows the bag 10 of the package 100 according to the invention in which welding lines 19' and 20' are made, disposed diagonally or inclined with respect to the bottom wall 13 and the welding lines 16, and which also have a certain curvature, while still intersecting the bottom wall 13 of the package.

In this case, the ideal extension lines 37' and 38' of the welding lines 19' and 20' are tangent to the welding lines 19' and 20' in proximity to the edges 17 and 18 of the bag 10, or of the bottom wall 13, and intersect or join in a zone or point 36' outside and below the bottom wall 13 of the bag 10, as happens for the diagonal and straight welding lines 19 and 20. It should be noted that the welding lines 19', 20' each have their own curvature, different from the other.

The diagonal and arched welding lines 19' and 20' can be made in welding directions 21' and 22', which are alternative to the welding directions 21 and 22 and schematically shown in broken lines in FIG. 3.

Figure 7:
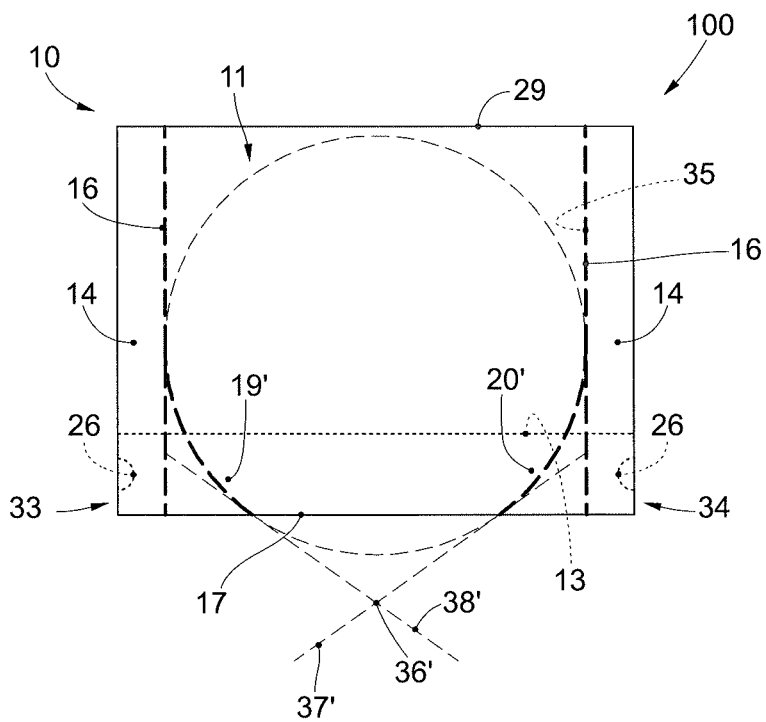

FIG. 7 shows a variant of the bag 10 of the package 100 according to the invention, in which welding lines 19' and 20' are made, defined as arcs of a circle belonging to the same circumference. In this variant too it is possible to identify the ideal extension lines 37' and 38' of the welding lines 19' and 20' as the tangents to the circumference on which the welding lines are defined in correspondence with their intersection with the bottom wall 13.

Advantageously, therefore, the present package 100 for dairy products, in particular dairy products P immersed in a preserving liquid, has a stability and resistance such as to prevent unwanted compressions or crushing of at least one dairy product contained inside it and in particular has a resistance and stability such as to be disposed on a support plane O even with only the bottom of the package, so that it can be stored, displayed and preserved in a substantially vertical position.

In particular, advantageously, the present package 100 allows to maintain the desired shape of the dairy product P contained in the bag 10, in particular when the dairy product P is introduced by falling into the package, even when still hot and deformable, as is typical for some dairy products. During the introduction of the dairy product P, moreover, the lateral walls 11 and 12 of the bag 10 do not get excessively close to the center of the compartment 35 and prevent the dairy product P from being crushed or compressed laterally, thus preventing undesired deformations.

Advantageously, moreover, the present package 100 can also be used, once opened, in a substantially vertical position, without spilling liquid, which is impossible with the current and common bags or packages.

The present package 100 can therefore advantageously be placed on a table in an open and upright position, so that the dairy product contained therein can be consumed conveniently, in its own preserving liquid and without undesirable spills thereof.

It is clear that modifications and/or additions of parts can be made to the package for dairy products, the sheet and the multi-layer film as described heretofore, and to the corresponding method of production, without departing from the field and scope of the present invention.

It is also clear that, although the present invention has been described with reference to some specific examples, a person of skill in the art shall certainly be able to achieve many other equivalent forms of package for dairy products, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Package for dairy products, in particular solid or semi-solid dairy products, comprising:
    a bag (10) provided with at least one pair of lateral walls (11, 12) reciprocally joined by means of first welding lines (16) and second welding lines (19, 20, 19', 20'), and at least one bottom wall (13), so as to define one housing compartment (35); and
    at least one dairy product (P) housed in said compartment (35) defined inside said bag (10),
    wherein the bag (10) comprises said second welding lines (19, 20, 19', 20') made in correspondence with top parts (33, 34) of the bag (10) and positioned on opposite sides of said bottom wall (13), said second welding lines (19, 20, 19', 20') being disposed diagonally with respect to said first welding lines (16) and with respect to the bottom wall (13) and configured and oriented so as to progressively narrow said housing compartment (35) toward said bottom wall (13) of the bag (10), said dairy product (P) comprising at least a central support zone (Z) on said bottom wall (13), said central support zone (Z) being defined by a rounded surface, such as a circular, oval, elliptical surface, and said bag (10) comprising lateral support zones (Z1, Z2) defined by at least said opposite top parts (33, 34),
    wherein said second welding lines (19, 20, 19', 20') are made in welding directions (21, 22, 21', 22') that intersect the bottom wall (13) of the package and provide ideal extension lines (37, 38, 37', 38') that cross at a point (36, 36') positioned externally to the bottom wall (13) of the package,
    wherein said bottom wall (13) of the package is made in a single piece with the lateral walls (11, 12) and is recessed toward the inside of the package, so that at least one folding line (28) is created therein;

wherein said dairy product (P) is at least partly immersed in a preserving liquid;

wherein the dairy product (P) rests partly on the bottom wall (13) of the bag (10) and at least part of forces generated by a weight of the dairy product and the preserving liquid is discharged onto the second welding lines (19, 20, 19', 20'), thus allowing a self-stabilization of the package substantially in a vertical position with respect to a support plane O; and the point (36, 36') is positioned on a longitudinal axis (L) of symmetry of the bag 10.

2. Package as in claim 1, wherein said dairy product (P) is at least a ball of stretched curd cheese.

3. Package as in claim 1, wherein said second welding lines (19, 20, 19', 20') are specular with respect to a longitudinal center line axis (L) of the package.

4. Package as in claim 1, wherein the angle (α) of inclination of said second welding lines (19, 20) is comprised between 15° and 60°.

5. Method to make a package for dairy products, in particular dairy products with a preserving liquid, as in claim 1, wherein it comprises:

shaping a sheet (25) so as to obtain at least two lateral walls (11, 12) and at least one bottom wall (13);

a first step of welding the lateral walls (11, 12) by means of first welding lines (16) so as to obtain a bag (10) provided with at least one housing compartment (35) for at least one dairy product (P);

at least a second step of welding said lateral walls (11, 12) by means of second welding lines (19, 20, 19', 20') made in correspondence with top parts (33, 34) of the bag (10) and positioned on opposite sides of said bottom wall (13), said second welding lines (19, 20, 19', 20') being inclined with respect to the first welding lines (16) and with respect to the bottom wall (13), so as to create a progressive narrowing of the housing compartment (35) toward the bottom of the bag (10) and so as to create lateral support zones (Z1, Z2) defined by at least said opposite top parts (33, 34);

introducing said at least one dairy product (P) inside said compartment (35) so that said dairy product (P) provides at least one central support zone (Z) on said bottom wall (13);

closing the package by means of joining the lateral walls (11, 12) in proximity to corresponding upper edges (31), thereby forming the package for dairy products, in particular solid or semi-solid dairy products, the package including:

a bag (10) provided with at least one pair of lateral walls (11, 12) reciprocally joined by means of first welding lines (16) and second welding lines (19, 20, 19', 20'), and at least one bottom wall (13), so as to define one housing compartment (35); and at least one dairy product (P) housed in said compartment (35) defined inside said bag (10), wherein said bag (10) comprises second welding lines (19, 20, 19', 20') made in correspondence with top parts (33, 34) of the bag (10) and positioned on opposite sides of said bottom wall (13), said second welding lines (19, 20, 19', 20') being disposed diagonally with respect to said first welding lines (16) and with respect to the bottom wall (13) and configured and oriented so as to progressively narrow said housing compartment (35) toward said bottom wall (13) of the bag (10), said dairy product (P) comprising at least a central support zone (Z) on said bottom wall (13), said central support zone (Z) being defined by a rounded surface, such as a circular, oval, elliptical surface, and said bag (10) comprising lateral support zones (Z1, Z2) defined by at least said opposite top parts (33, 34), wherein said second welding lines (19, 20, 19', 20') are made in welding directions (21, 22, 21', 22') that intersect the bottom wall (13) of the package and provide ideal extension lines (37, 38, 37', 38') that cross at a point (36, 36') positioned externally to the bottom wall (13) of the package, wherein said bottom wall (13) of the package is made in a single piece with the lateral walls (11, 12) and is recessed toward the inside of the package, so that at least one folding line (28) is created therein, wherein said dairy product (P) is at least partly immersed in a preserving liquid;

wherein the dairy product (P) rests partly on the bottom wall (13) of the bag (10) and at least part of forces generated by a weight of the dairy product and the preserving liquid is discharged onto the second welding lines (19, 20, 19', 20'), thus allowing a self-stabilization of the package substantially in a vertical position with respect to a support plane O; and the point (36, 36') is positioned on a longitudinal axis (L) of symmetry of the bag 10.

6. Method as in claim 5, wherein said dairy product (P) is inserted inside the bag (10) while still warm, that is, before a cooling step of the package (100).

\* \* \* \* \*